United States Patent [19]

Conley et al.

[11] Patent Number: 5,072,420
[45] Date of Patent: Dec. 10, 1991

[54] FIFO CONTROL ARCHITECTURE AND METHOD FOR BUFFER MEMORY ACCESS ARBITRATION

[75] Inventors: Patrick D. Conley, Fullerton; Jin H. Hwang, Cerritos; Marc Acosta, Mission Viejo; Virgil V. Wilkins, Corona, all of Calif.

[73] Assignee: Western Digital Corporation, Irvine, Calif.

[21] Appl. No.: 324,313

[22] Filed: Mar. 16, 1989

[51] Int. Cl.$^5$ .................. G06F 13/34; G06F 13/14
[52] U.S. Cl. ........................ 395/425; 364/939; 364/939.3; 364/935.41; 364/937.01; 364/927.94; 364/927.95; 364/DIG. 2
[58] Field of Search ... 364/200 MS File, 900 MS File; 365/189.05, 222; 340/825.06

[56] References Cited

U.S. PATENT DOCUMENTS

| | | | |
|---|---|---|---|
| 4,257,095 | 3/1981 | Nadir | 364/200 |
| 4,272,809 | 6/1981 | Kadowaki | 364/900 |
| 4,272,815 | 6/1981 | Kadowaki et al. | 364/200 |
| 4,447,873 | 5/1984 | Price et al. | 364/200 |
| 4,760,515 | 7/1988 | Malmquist et al. | 364/200 |
| 4,796,232 | 1/1989 | House | 365/189 |
| 4,837,677 | 6/1989 | Burrus, Jr. et al. | 364/200 |
| 4,847,757 | 7/1989 | Smith | 364/200 |

Primary Examiner—Michael R. Fleming
Assistant Examiner—Gopal C. Ray
Attorney, Agent, or Firm—Christie, Parker & Hale

[57] ABSTRACT

Access to a buffer memory is provided by a controller architecture and method employing an arbiter state machine for control of data transfer between multiple external peripheral devices and the dynamic random access memory buffer. Data transfer channels for each peripheral device include a first-in, first-out sub-buffer. Each data transfer channel communicates transfer requests to the arbiter when data is present in the FIFO. When data transfer to or from the FIFO nears an overrun or underrun condition, the data channel issues an urgent request to the arbiter state machine. The arbiter state machine prioritizes data transfer requests for enabling transfer between the buffer memory and data channels. Once a data transfer is in process it continues uninterrupted unless an urgent request is received from another device. In addition, the invention includes a refresh circuit for the dynamic RAM incorporating similar request and urgent request signals provided to the arbiter state machine for resolution.

6 Claims, 5 Drawing Sheets

FIFO CONTROL ARCHITECTURE AND METHOD FOR BUFFER MEMORY ACCESS ARBITRATION

BACKGROUND OF THE INVENTION

1. Field of the Invention

This invention relates generally to controllers for data transfer between peripheral storage devices and a host computer. In particular, the invention provides an architecture and method for interfacing multiple external peripheral devices to a dynamic random access memory buffer using an arbitrated priority access to the buffer for page mode transfer to and from the buffer.

2. Prior Art

Peripheral controllers for data storage units such as hard disks control communications between a host computer system and the data storage unit. Typically, the use of a buffer memory associated with the peripheral controller to accommodate the differing data transfer rates of the storage device and computer has been employed. Examples of such controllers are disclosed in U.S. Pat. No. 4,527,233 to Ambrosius III, et al. and in U.S. patent application Ser. No. 07/220,531 to Bonke, et al. for a DATA RECORDING SYSTEM BUFFER MANAGEMENT AND MULTIPLE HOST INTERFACE CONTROL, filed July 18, 1988.

The use of dynamic random access memories as the buffer in peripheral control devices is desirable due to their simplicity and cost effectiveness. However, typically, dynamic RAMs do not have random access bandwidth sufficient to sustain multiple high speed devices. This is partially due to the requirement for refreshing the memory to maintain data integrity. Many dynamic RAMs, however, do incorporate a feature known as "page mode or static column" which allows an increase in their bandwidth. To accommodate the page mode feature to obtain the higher bandwidth, the controller must be able to accommodate data transfers in a continuous block. Such "burst mode" transfers are compatible with the direct memory access (DMA) protocols currently in existence. However, the controller must provide a first-in-first-out (FIFO) subbuffer to handle data streaming from the external devices to the DRAM buffer. In addition, the controller must be able to arbitrate the simultaneous demands on the buffer for transfers to and from multiple external devices such as a host computer and disk drive, plus accommodate the refresh requirements of the DRAM.

SUMMARY OF THE PRESENT INVENTION

The present invention provides a control architecture and method combining dual FIFO's with a DRAM array buffer under the control of a standard microprocessor for interfacing multiple external peripheral devices. The architecture includes input/output (I/O) channels for each external device. Each channel has a FIFO connecting the associated peripheral device to the DRAM buffer. An incrementable memory pointer in the channel provides addressing of the buffer for data transfer and a transfer counter accommodates burst transfers on the channel. Since the data transfer rate of the external peripheral and the DRAM are not identical, the FIFO is monitored to determine the number of data bytes present in the FIFO. If data is present in the FIFO, a first level data request is provided to an arbiter state machine in the controller. If the FIFO is nearing full or empty, a second level data request is provided to the arbiter.

The requirement for refreshing the DRAM is monitored similarly. A resettable timer monitors the desired refresh cycle interval calculated for each page or row of the DRAM based on the total DRAM refresh interval requirement. Upon expiration of the timer, a first level refresh request is provided to the arbiter. A counter responsive to the expiration of the timer increments in response to each expiration of the timer. Upon reaching a predetermined count, a second level refresh request signal is issued to the arbiter. A second memory address pointer is provided to maintain the row address of the next memory page to be refreshed and is incremented upon each refresh being accomplished.

The arbiter receives the various level data requests from the channels and the refresh requests from the refresh circuit. The arbiter enables transfer by a channel or refresh based on a predetermined priority assigned to the channels and refresh circuit including consideration of the level of requests.

The microprocessor is provided with access to the DRAM through a buffer data latch for programmed input/output or through the FIFO of one of the channels for burst transfer. A third memory pointer is provided to separately address the DRAM for microprocessor data transfer.

DETAILED DESCRIPTION OF THE INVENTION

Figure 1:
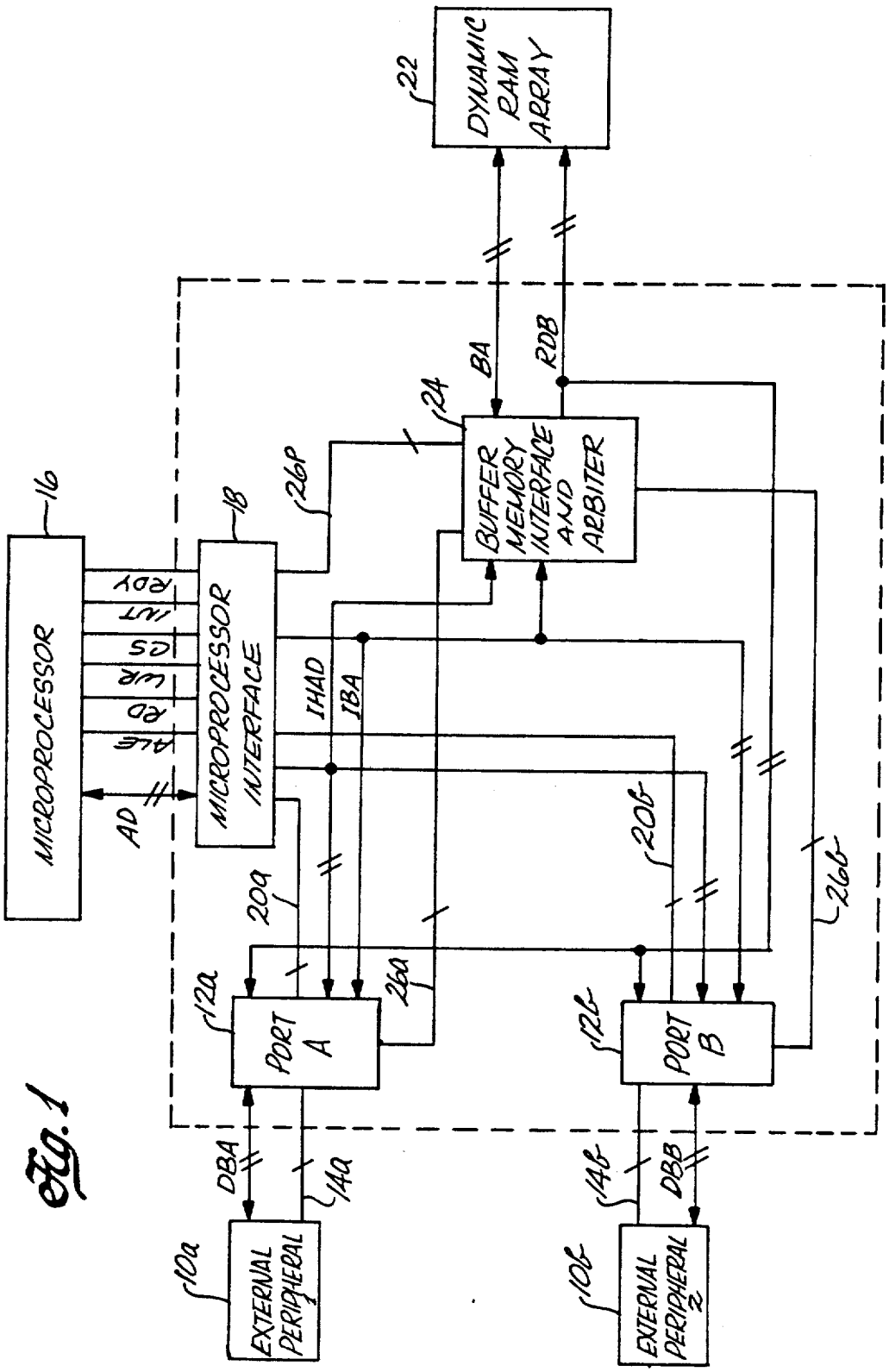
FIG. 1 provides a top level block diagram of the controller architecture.

The embodiment of the invention shown in the drawings interfaces two external peripheral devices, such as a data storage device and a host computer, to the buffer. As shown in FIG. 1, the first external peripheral 10A is interfaced to the controller through the first channel or Port A, 12A. The data bus DBA and the handshake control signals 14A will be discussed in greater detail subsequently. Similarly, the second external peripheral 10B is interfaced to the controller through the second channel or Port B, 12B. The data bus from the second peripheral DBB and the handshake control lines 14B are similar to those of the first channel. The microprocessor 16 communicates with the controller through a microprocessor interface 18 receiving the standard address data bus AD and the control signals for read RD, write WR, chip select CS, interrupt INT, ready RDY, and microprocessor address strobe ALE. The functions of these standard signals are well-known to those skilled in the art.

The address data bus for distribution of microprocessor commands and data internal to the controller is designated INAD. Handshake control lines 20A and 20B for handshake and control between the microprocessor interface and Port A and Port B respectively will be discussed in greater detail subsequently.

The dynamic RAM array 22 is interfaced to the controller through the buffer memory interface and arbiter 24. The buffer address bus BA and RAM data bus RDB provide addressing and data transfer to and from the buffer formed by the dynamic RAM array. The internal buffer address bus IBA provides internal transfer of the buffer memory address pointers of the microprocessor interface and data channels to the buffer interface and will be discussed in greater detail subsequently.

Figure 2:
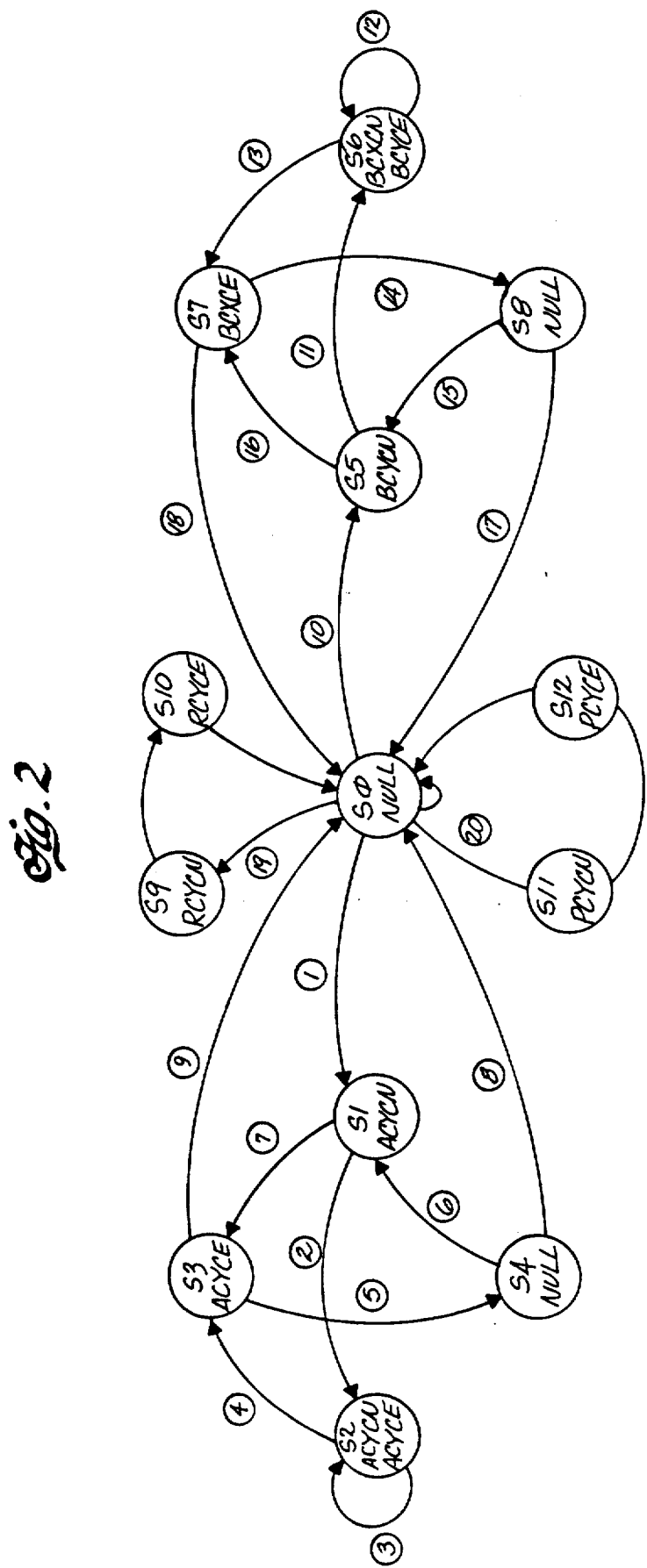
FIG. 2 is a state diagram for the arbiter state machine.

Control line sets 26A, 26B, and 26P provide communications between Port A, Port B and the microprocessor interface respectively and the arbiter for status of data transfers by the channels and microprocessor interface to the buffer and corresponding control by the arbiter based on the priority of the respective transfer. The arbiter primarily comprises a state machine having the states characterized by the state diagram of FIG. 2. Detailed discussion of the various states will be conducted subsequently.

Refresh of the dynamic RAM array is conducted by circuity within the buffer interface which will be described in greater detail subsequently. In the present invention as shown in the drawings, each of the data channels and the refresh circuit has two levels of requests based on their status. A first level and a second or urgent level which are considered during arbitration. The microprocessor has a single request level. Priority may be assigned to either of the peripheral channels based on the characteristics of the external device.

In one embodiment of the invention a priority system for arbitration defined in descending order is microprocessor requests, refresh requests, the higher priority peripheral channel and finally the lower priority peripheral channel. The priority is established by the firmware programming of the microprocessor.

The increased overall bandwidth for data transfer to and from the buffer is achieved by reducing the number of required arbitrations. If the external device on one of the channels is a "nonpausible" and the other channel is a "pausible" then the first channel is given priority in arbitration. If the external device connected to the channels are peers such as both being pausible or both being nonpausible, then the channel priority is selected and programmed in the microprocessor firmware. Arbitration does not occur until the requestor currently being serviced has completed an entire burst. This utilizes the page mode capability of the DRAM and provides the effective bandwidth increase for transfer to and from the DRAM. Page mode bursts between the channels and buffer are not interrupted by requests from higher priority requesters in most cases. Arbitration will occur if the higher priority channel has issued an urgent or second level request. The urgent request forces arbitration to occur.

Figure 3:
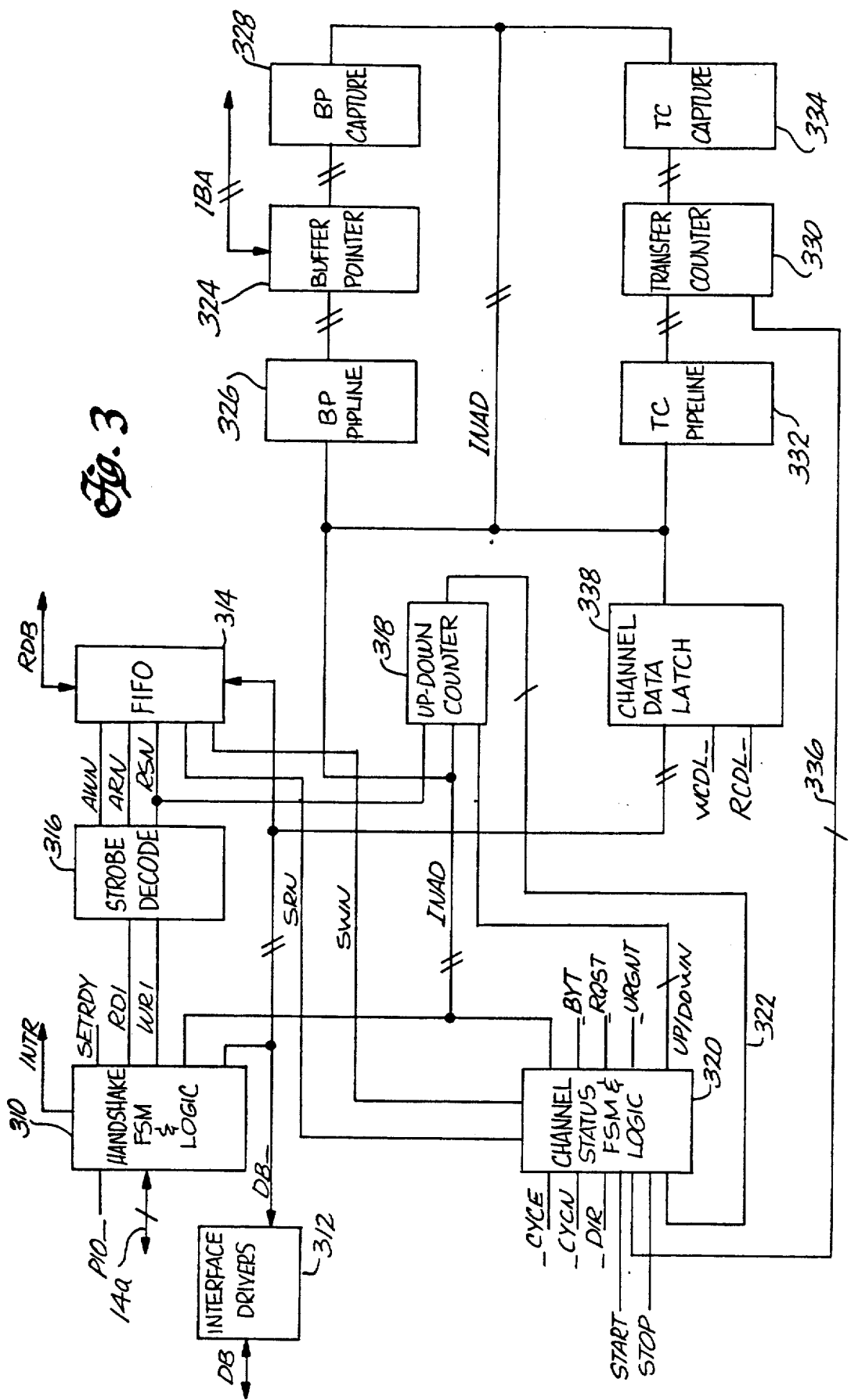
FIG. 3 is a block diagram of the individual data channels designated Port A and Port B of FIG. 1.

Each of the data channels is constructed as shown in FIG. 3. Communication with the external peripheral is accomplished through a handshake finite state machine and logic circuit 310. The handshake communication lines 14A as discussed for FIG. 1 provide standard handshake signals known to those skilled in the art, including direct memory access signals such as DMA requests, DMA acknowledge, read and write enable and parity information. Incoming and outgoing data are provided to the external device from data bus DB through the interface drivers 312. Data are received and transmitted in the channel through a FIFO 314 which transmits data to and from the buffer on the RAM data bus RDB. In the embodiment shown, the FIFO in each channel is a 15-byte device to accommodate the desired transfer rates. The read and write strobes received from the external device through the handshake logic are converted to internal signals RDI and WRI respectively. Strobe decode logic 316 receives RDI and WRI and provides asynchronous write and read strobes AWN and ARN respectively to the FIFO. The strobe decode provides signal RSN to the up/down counter 18 which tracks the number of data bytes present in the FIFO.

The strobe decode logic provides synchronous count capability for the up/down counter keyed to the asynchronous read and write signals of the external peripheral. While synchronization is necessary in the up/down counter for the operation of the device, the most rapid response for the counter is required to avoid overrunning or underrunning the FIFO by the asynchronous peripheral. A circuit architecture to accomplish the required decoding is described in the patent application for a DATA SAMPLING ARCHITECTURE to Hwang, et al. having a common assignee with the present invention and designated Ser. No. 325,191, filed on Mar. 16, 1989, now U.S. Pat. No. 4,935,942, the disclosure of which is incorporated herein by reference.

The channel status finite state machine and logic 320 controls transfer between the FIFO and the buffer through synchronous read and write signals SRN and SWN. Count direction for the up/down counter based on data entrance to or extraction from the FIFO is provided by the up/down control lines. The up/down counter provides data on the number of bytes present in the FIFO to the channel status logic on control lines 322. Several conditions or tap points representing the number of bytes in the FIFO may be present. Tap points representing the beginning of data insertion or extraction in the FIFO and status indicating near exhaustion of the FIFO are provided. In the preferred embodiment, tap points of 3 bytes and 13 bytes present in the FIFO represent the former condition, while 8 bytes present in the FIFO represent the second condition. Based on the status of the tap lines the channel status logic provides a request signal RQST for the first condition or an urgent signal URGNT for the second condition to the arbiter. A direction of transfer signal DIR is also provided. Arbiter signals to the channel status logic include a cycle enable signal CYCE which enables the channel and a cycle next signal CYCN allowing channel set up prior to enablement. Communications by the microprocessor to various elements of the channel are provided through the internal address and data bus INAD.

Addressing for data transfer to the buffer is provided through an address pointer. The address pointer comprises an incrementable buffer pointer 324 which provides the buffer address on the internal buffer address bus IBA. A pipeline architecture allows the microprocessor to load subsequent initial buffer pointers in a BP pipeline register 326. The subsequent address pointer may then be loaded into the buffer pointer upon completion of the first transfer. A buffer pointer capture register 328 is provided to allow the microprocessor to read the current address in the buffer pointer while a transfer is in process.

Similarly, for burst transfers, a decrementable transfer counter 330 maintains the transfer count during burst transfer and a TC pipeline register 332 may be loaded with a subsequent transfer count by the microprocessor. A transfer count capture register 334 allows the microprocessor to read the present transfer count during a burst transfer. As a burst transfer is nearing completion, the transfer counter provides signals on control lines 336 to the channel status logic which in turn issues a single byte request signal BYT to the arbiter. As will be discussed in greater detail subsequently, the burst is then interrupted and single byte transfers conclude the data transfer to avoid overrunning or underrunning the FIFO.

Each of the data channels is also provided with a channel data latch 338 for communication by the microprocessor with the buffer through the data channel. Two modes are available for communication by the microprocessor. The first "loop-back" mode allows the microprocessor to read data from the latch or the write data to the latch without incurring a wait state. The channel status logic accomplishes the transfer of data between the latch and the FIFO while controlling to prevent overrun conditions. The second function of the channel data latch allows programmed input/output by use of the RDY function of the microprocessor. In this mode the assertion of the write channel data latch WCDL or read channel data latch RCDL signals causes the handshake logic to de-assert the set ready SETRDY signal. This state is held until arbitration for the channel and actual data transfer have been accomplished. When the transfer is complete, the SETRDY signal is reasserted and the cycle ends.

Figure 4:
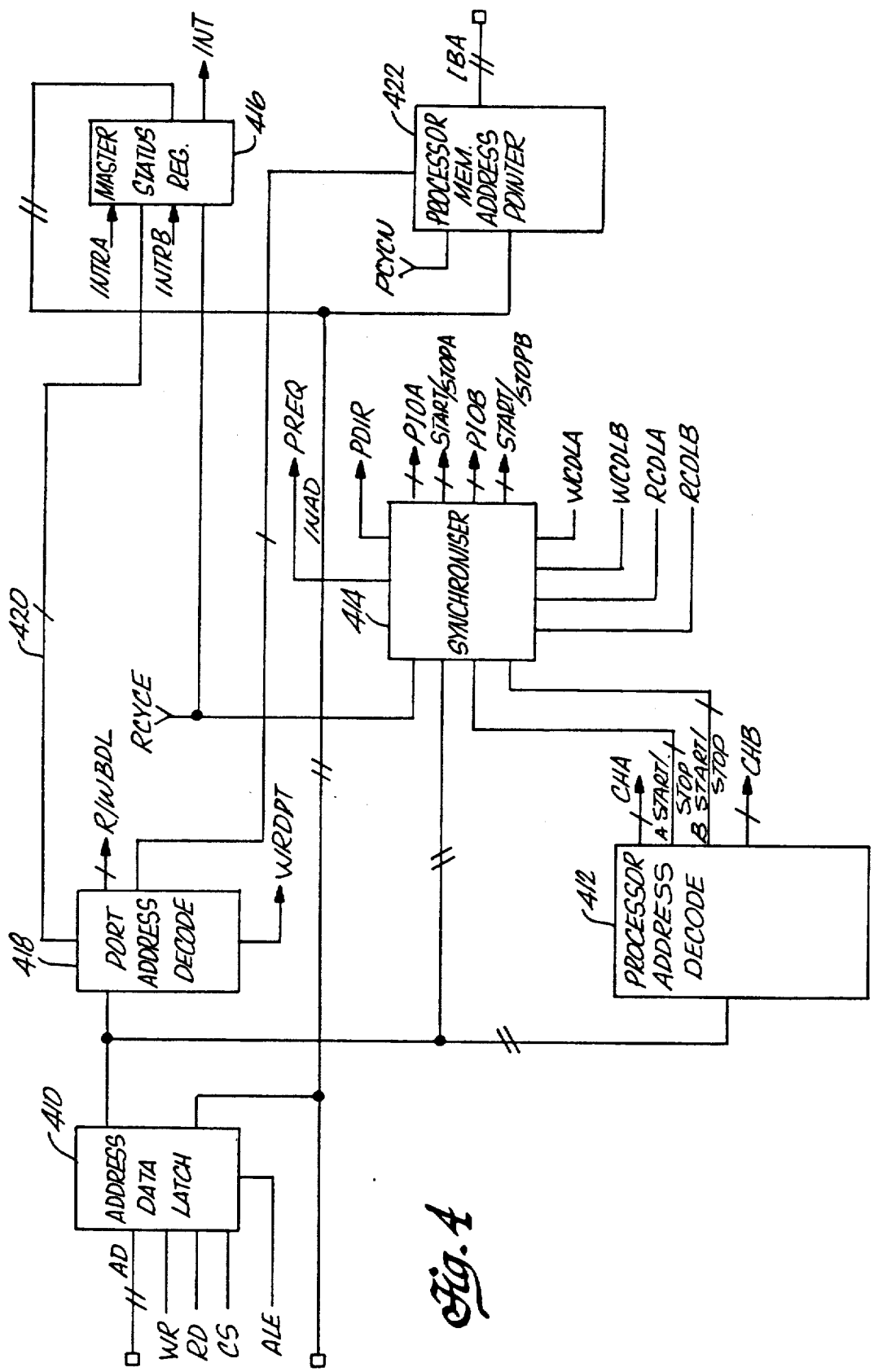
FIG. 4 is a block diagram of the microprocessor interface control.

The microprocessor interface is shown in greater detail in FIG. 4. The address data latch 410 communicates with the microprocessor on the AD bus. The WR, RD, CS, and ALE signals control the latch as known previously in the art. The microprocessor address decode circuit 412 decodes microprocessor commands for control of the data channels which are provided through multiple control lines CHA and CHB respectively, these control lines include functions for reading and writing to the buffer pointers, transfer counters, and control registers in the handshake and channel status logic. A synchronizer 414 is provided to synchronize read and write signals to the channel data latches in each respective channel through signals WCDLA, WCDLB, or RCDLA and RCDLB and to provide programmed input and output control to the channels through control lines PIOA and PIOB respectively. Channel start and stop signals decoded by the processor address decode are provided to the synchronizer on control lines ASTART/STOP and BSTART/STOP and pass through the synchronizer to the channel status logic on the START/STOPA control lines and START/STOPB control lines to the respective channels. A master status register 416 receives interrupt requests from the handshake logic of the channels INTRA and INTRB, respectively, to provide interrupt signal INT to the microprocessor. A port address decode 418 provides read and write commands to the master status register on control lines 420. A processor memory address pointer 422 is used to provide a buffer address on the internal buffer address bus IBA for data transfer between the processor and buffer. The internal address data bus INAD provides data transfer between the master status register, processor memory address pointer, and the address data latch.

Figure 5:
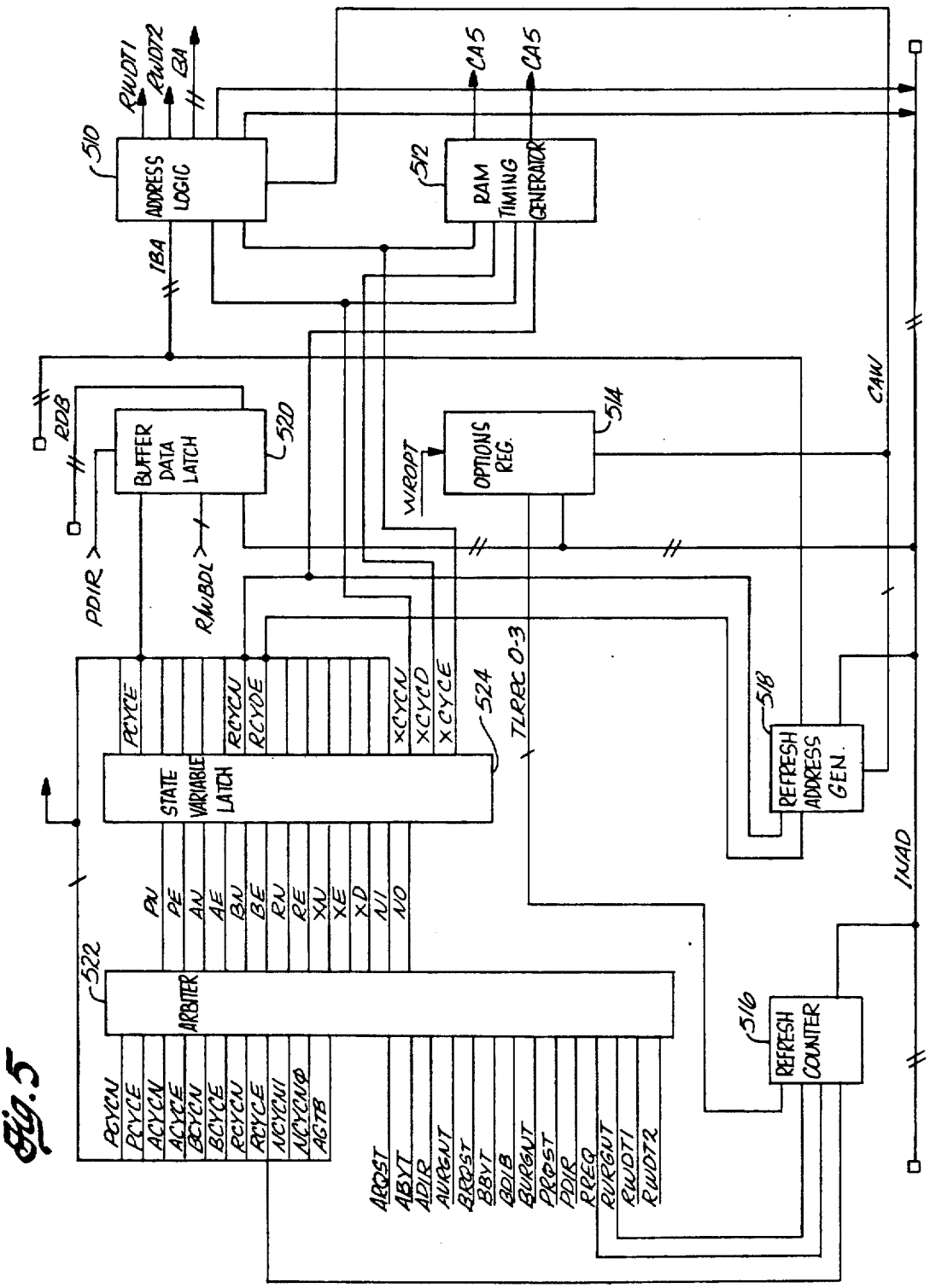
FIG. 5 is a block diagram of the buffer memory interface and arbiter.

The buffer memory interface and arbiter is shown in greater detail in FIG. 5. The buffer memory interface comprises address logic 510 which receives buffer address information on the internal buffer address bus IBA from the channel buffer pointers and microprocessor memory address pointer. The address logic provides the buffer address to the dynamic RAM array on the buffer address bus BA under control of the arbiter state machine. RAM timing generator logic 512 provides the column address strobe CAS and row address strobe RAS to the dynamic RAM array.

The basic configuration of the dynamic RAM array may vary from 16 kilobytes to one megabyte. In the embodiment shown in the drawings an options register 514 written by the WROPT signal from the port address decode logic of the microprocessor interface provides a column address width signal CAW to the address logic to define memory size.

Refresh of the dynamic RAM is accomplished through a refresh counter 516 and a refresh generator 518. The refresh address generator cycles through the row addresses of the memory to provide a refresh address on the internal buffer address bus to the address logic. The refresh counter counts down to produce nominally 15.6 microsecond refresh cycles for standard 128 cycle to millisecond dynamic RAMs. A variable clock rate for the invention is supported by the microprocessor providing a rate count field to the options register which is interpreted and provided to refresh counter as a timed refresh rate count control lines TLRRC0 through TLRRC3 to set the refresh counter. A circuit embodying this approach is defined in the patent application for a METHOD AND APPARATUS FOR DRAM REFRESH to Connely, et al. having a common assignee with the present application and designated Ser. No. 07/324,314, filed on Mar. 16, 1989, the disclosure of which is incorporated herein by reference.

The refresh counter counts down the refresh interval for each row of the DRAM and issues a refresh request (RREQ) to the arbiter upon expiration. If the refresh request is not serviced, the request is queued into a second counter. Upon queuing of four refresh cycles, the refresh counter issues a refresh urgent (RURGNT) signal to the arbiter.

A buffer data latch 520 is provided for data transfer from the microprocessor to the buffer. Data is transferred between the buffer data latch and the microprocessor on the INAD bus by assertion of the read or write buffer data latch signal R/WBDL from the port address decode to the buffer data latch. The direction of transfer PDIR is provided from the synchronizer to the buffer data latch. Data is transferred between the buffer data latch and the buffer on the RAM data bus RDB.

The arbiter 522 receives status signals from each of the data channels, the microprocessor interface, and the refresh counter in the form of data requests or urgent requests as previously described. The signals are processed by the arbiter state machine to provide outputs which are captured by the state variable latch 524 and fed back to the arbiter. The operation of the arbiter is best understood by returning to the state diagram of FIG. 2. State S0 is a NULL state which is the initial state of the arbiter prior to any transfer requests. Arbitration from the NULL state is based on the basic priority of the processor, refresh and channel A or channel B. Simultaneous requests will be determined based on this priority. After priority resolution, the arbiter will transition to the next state by path 1, which is the equivalent of a first level request from channel A or path 10, which is a result of a first level request from channel B, path 19, which the result of a first level request from the refresh circuit, or path 20, which is the result of a request from the processor. Path 1 results in an output AN, path 10 results in an output BN, path 19 results in an output RN, and path 20 results in an output PN, respectively, from the arbiter. The respective states latched by the state variable latch are ACYCN, BCYCN, RCYCN, or PCYCN. Using the A-channel request as an example, the transition to state A cycle next or state S1 provides the ACYCN signal to the channel status finite state machine and logic for channel A. In response the channel status FSM and logic prepares the channel for burst transfer, loading the transfer count and buffer pointer from their respective pipeline registers. In the absence of urgent requests from the B channel or the refresh circuit, a transfer count sufficient to not require single byte transfer and no row change detected by the address logic, the state machine will transition to state S2 along path 2. state 2 results in assertion of both the ACYCN signal and the A-cycle enable signal ACYCE, and transfer is initiated in the A channel. If no urgent requests are pending, the transfer count does not require a single byte transfer and the address logic look ahead does not detect a row change requirement, the arbiter will output signal AE and burst transfer will proceed with the state machine cycling through path 3. If any urgent request is received, the transfer count reduces to require single byte transfer or a row detect look ahead is received, the state machine will transition along path 4 to state S3 resulting in the ACYCE signal only to the channel status with the ACYCN signal de-asserted. If the row detect signal is present and no urgent signals or single byte transfer requirement is present, the state machine transitions along path 5 to state S4 resulting in an output from the arbiter of N1 which is latched to produce the no cycle next 1 signal NCYCN1 which allows the RAM timing generator to issue a row address strobe changing the row. If no urgent request is pending, the state machine then transitions through path 6 to state S1 again resulting in assertion of the ACYCN signal and subsequent transition to state S2. The burst will continue until the arbiter state machine resides in states S3 or S4, and an urgent request is received by the arbiter from the refresh circuit or channel B, or the requirement exists for single byte transfer to conclude the burst. In either case the state machine will transition along path 8 or 9 returning to the null state. Operation is similar for the B channel and refresh circuit.

The arbiter provides output signals XN, XE, and XD which are latched to provide control signals XCYCN, XCYCE, XCYCD respectively for the RAM timing generator. These CYCLE NEXT, CYCLE EXECUTE and CYCLE DELAY signals are employed by the address logic and RAM timing generator for proper buffer memory setup to achieve necessary windows for READ and WRITE operations.

Complete definition of the logical interaction of the states, path equations and output variables are provided in Table 1. Priority between the A and B channels is defined by the A>B signal AGTB.

TABLE I

```
CKTNAME:  ARB;
TYPE:     CMB;
INPUTS:   AACYCE, AACYCN, ABCYCE, ABCYCN,
          ABYT, ADIR, AGTB, APCYCE, APCYCN,
          ARCYCE, ARCYCN, ARQST, AURGNT,
          BBYT, BDIR, BRQST, BURGNT, NCYCN0,
          NCYCN1, PDIR, PRQST, RREQ, RURGT,
          RWDT1, RWDT2;
OUTPUTS:  AE AN BE BN N0 N1 PE PN RE RN XD XE XN ;
OPTIONS:  ROOT_NAME (ARB);
••••••••••••••••••••••••••••••••••••••••••••••••••••••••••••• ;
```

TABLE I-continued

```
                                                      9-2-87
• THIS COMBINATIONAL LOGIC BLOCK ALONG
  WITH THE SVL BLOCK MAKE UP THE
• ARBITER STATE MACHINE
•
•••••••••••••••••••••••••••••••••••••••••••••••••••••••••••••
<DCBE>
S0 = !AACYCN * !AACYCE * !ABCYCN * !ABCYCE *
     !APCYCN * !APCYCE * !ARCYCN *  !ARCYCE *
     !NCYCN0 * !NCYCN1
S1 = AACYCN * !AACYCE
S2 = AACYCE * AACYCN
S3 = AACYCE * !AACYCN
S4 = NCYCN1 * !NCYCN0
S5 = ABCYCN * !ABCYCE
S6 = ABCYCE * ABCYCN
S7 = ABCYCE * !ABCYCN
S8 = !NCYCN1 * NCYCN0
S9 = ARCYCN
S10 = ARCYCE
S11 = APCYCN
S12 = APCYCE
BGTA = !AGTB
AAURGNT = AURGNT * AGTB
BBURGNT = BURGNT * BGTA
EQ1 = ARQST * !( RREQ + PRQST + (BRQST * BGTA) )
EQ2 = ARQST * !( ABYT + RWDT1 + BBURGNT +
      RURGT)
EQ3 = ARQST * !( RWDT2 + BBURGNT + RURGT +
      ABYT )
EQ4 = !EQ3
EQ5 = ARQST * RWDT1 * !(BBURGNT + ABYT +
      RURGT )
EQ6 = ARQST * !( BBURGNT + RURGT )
EQ7 = !EQ2
EQ8 = !EQ6
EQ9 = !EQ5
EQ10 = BRQST * !( RREQ + PRQST + (ARQST * AGTB) )
EQ11 = BRQST * !( BBYT + RWDT1 + AAURGNT +
       RURGT)
EQ12 = BRQST * !( RWDT2 + AAURGNT + RURGT +
       BBYT )
EQ13 = !EQ12
EQ14 = BRQST * RWDT1 * !(AAURGNT + BBYT +
       RURGT )
EQ15 = BRQST * !( AAURGNT + RURGT )
EQ16 = !EQ11
EQ17 = !EQ15
EQ18 = !EQ14
EQ19 = RREQ * !PRQST
EQ20 = PRQST
```
```
AE.ON = (S1 * EQ2) + (S1 * EQ7) + (S2 * EQ3) +
        (S2 * EQ4)
AN.ON = (S0 * EQ1) + (S1 * EQ2) + (S2 * EQ3) +
        (S4 * EQ6)
BN.ON = (S0 * EQ10) + (S5 * EQ11) + (S6 * EQ12) + (S8 *
        EQ15)
BE.ON = (S5 * EQ11) + (S5 * EQ16) + (S6 * EQ12) + (S6 *
        EQ13)
RN.ON = S0 * EQ19
RE.ON = S9
PN.ON = S0 * EQ20
PE.ON = S11
XN.ON = AN.ON + BN.ON + PN.ON
XE.ON = AE.ON + BE.ON + PE.ON
N1.ON = S3 * EQ5
N0.ON = S7 * EQ14
XD.ON = ADIR * (( S1 + S2 + S3 + S4) + (EQ1 * S0)) +
        BDIR * ((S5 + S6 + S7 + S8) + (EQ10 *
        S0)) +
        PDIR * ((S11 + S12) + (EQ20 * S0))
<END>
```

An example of operation of the present invention is best described assuming an initial state where all devices are currently active, the refresh time has arrived and the microprocessor is requesting a data item. Further assume that the invention is currently servicing the FIFO that is attached to the first channel or device port A. The microprocessor is currently at a wait bus cycle because the RDY signal from the invention is inactive. The invention will move data to or from the memory buffer and the Port A FIFO until the FIFO is full or empty, or the transfer count of port A exhausts. If during this sequence the arbiter detects that a dynamic page boundary is being crossed, the invention will update the row address and continue the page mode transfer. While this action is occurring, any byte transfers to or from the other device port are stored in that device port's FIFO. When Port A has finished its data transfers, the arbiter will first service the microprocessor requests, then the refresh request, or requests, depending on how many refreshes are queued in the counter, both of which have priority over block transfers to the device ports. The arbiter will then initiate transfer between the Port B FIFO and the dynamic RAM array.

Having now described the invention in detail as required by the patent statutes, those skilled in the art will recognize modifications to the invention to achieve specific results. Such modifications are within the spirit and scope of the invention as defined in the following claims.

We claim:

1. A FIFO control architecture for interfacing multiple external peripheral devices to a dynamic RAM buffer memory comprising at least two I/O channels, each of the channels having:
    a FIFO connecting the associated external peripheral device and the DRAM buffer memory;
    first memory pointer means for defining an address in the buffer memory for transfer of data between the peripheral device and the buffer memory;
    means for establishing and tracking a transfer count between the peripheral device and the buffer memory;
    means for determining the number of data bytes in the FIFO;
    means for generating a first level data request responsive to a first predetermined number of bytes in the FIFO and a second level data request responsive to a second predetermined number of bytes in the FIFO; and
    a first enabling means for enabling the FIFO for data transfer to the buffer memory address in the first pointer means;
    a DRAM refresh circuit connected to the buffer memory and having
    means for timing a desired refresh interval for a page of the DRAM and signalling expiration of the interval;
    a counter incremented by the signal from the timing means;
    means for generating a first level refresh request signal upon expiration of the timer and a second level refresh request signal upon the counter reaching a predetermined count;
    a second memory address pointer means for designating the page of the DRAM to be refreshed; and
    a second enabling means for enabling the refresh circuit to address the page designated by the second pointer incrementally for the number of counts in the counter; and
    an arbiter state machine connected to the first and second enabling means, the arbiter state machine further receiving and responsive to the first and second level data request signals and the first and second level refresh request signals for enabling the first and second enabling means thereby selectively enabling the FIFOs and the refresh circuit based on a predetermined priority of the external peripheral devices and the level of request signals.

2. A FIFO control architecture as defined in claim 1 further comprising:
    a microprocessor interface having means for latching data from the microprocessor connected to the buffer memory and issuing a microprocessor request signal to the arbiter state machine;
    a third memory address pointer means for designating an address in the buffer memory for transfer of data between the microprocessor and the buffer memory; and
    a third enabling means for enabling the latch means, the third enabling means enabled by the arbiter state machine responsive to the microprocessor request signal.

3. A FIFO control architecture as defined in claim 2 wherein the first memory pointer means comprises:
    a first register receiving from the microprocessor a next memory address for transfer of data;
    an incrementable buffer pointer connected to the buffer memory to address the memory, the pointer incremented upon command from the arbiter and the pointer connected to the register to receive the next memory address for block data transfer upon command from the arbiter; and
    a second register connected to the buffer pointer to latch the current buffer address in the pointer upon command from the microprocessor.

4. A FIFO control architecture as defined in claim 3 wherein the transfer count means comprises:
    a transfer count register receiving the next transfer count for block transfer of data from the microprocessor;
    a transfer counter responsive to the arbiter for counting data transfer to the buffer memory, the transfer counter also connected to the transfer count register to receive the next transfer count upon command from the arbiter; and
    a transfer count capture register connected to the transfer counter to latch the current transfer count upon command from the microprocessor.

5. A method using a FIFO control architecture employing an arbiter state machine for interfacing multiple external peripheral devices through data channels having FIFO to a dynamic RAM buffer memory, the method comprising the steps of:
    prioritizing the peripheral devices with the arbiter;
    monitoring data transfer requests from the data channels for the peripheral devices by the arbiter;
    issuing a data transfer request by the data channel based on the number of bytes in the FIFO for a peripheral device requiring data transfer;
    enabling data transfer by a peripheral device to the buffer memory through the FIFO based on chronological receipt of the transfer request by the arbiter and priority of the external device requesting the data transfer;
    enabling subsequent data transfer by other external peripheral devices by the arbiter upon completion of the data transfer by the presently enabled device;
    monitoring for urgent data transfer requests from the data channel based on the number of bytes in the FIFOs in the data channels for the peripheral devices;

interrupting the present data transfer from the FIFO to the buffer memory when an urgent data transfer request is received;

enabling data transfer to the buffer memory by the data channel making the urgent request; and completing data transfer to the buffer memory peripheral device upon completion of the urgent request data transfer.

6. A method as defined in claim 5 further comprising the steps of:

monitoring a buffer memory refresh circuit for refresh requests;

enabling a memory refresh when no data transfer is in process;

monitoring the memory refresh circuit for an urgent refresh request;

interrupting a data transfer from a FIFO to the buffer memory which is in process upon receiving an urgent memory refresh request;

enabling the memory refresh circuit to refresh the memory; and completing the interrupted data transfer after completion of the memory refresh.

* * * * *